(12) United States Patent
Verzwyvelt et al.

(10) Patent No.: US 11,526,150 B2
(45) Date of Patent: Dec. 13, 2022

(54) INFERRING OBJECT ATTRIBUTES

(71) Applicant: HEWLETT-PACKARD DEVELOPMENT COMPANY, L.P., Spring, TX (US)

(72) Inventors: Vanessa Verzwyvelt, Vancouver, WA (US); Matthew A Shepherd, Vancouver, WA (US); Morgan T Schramm, Vancouver, WA (US); Andrew E Fitzhugh, Palo Alto, CA (US); Lihua Zhao, Palo Alto, CA (US); Jacob Tyler Wright, San Diego, CA (US); Hector Lebron, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1121 days.

(21) Appl. No.: 16/076,241

(22) PCT Filed: Jul. 28, 2017

(86) PCT No.: PCT/US2017/044429
§ 371 (c)(1),
(2) Date: Aug. 7, 2018

(87) PCT Pub. No.: WO2019/013829
PCT Pub. Date: Jan. 17, 2019

(65) Prior Publication Data
US 2021/0200186 A1    Jul. 1, 2021

Related U.S. Application Data

(63) Continuation-in-part of application No. PCT/US2017/041295, filed on Jul. 10, 2017, and a
(Continued)

(51) Int. Cl.
*G06N 5/04* (2006.01)
*G05B 19/4099* (2006.01)
*B33Y 50/00* (2015.01)

(52) U.S. Cl.
CPC .......... *G05B 19/4099* (2013.01); *B33Y 50/00* (2014.12); *G06N 5/04* (2013.01); *G05B 2219/49007* (2013.01)

(58) Field of Classification Search
USPC .................................................... 706/46, 45
See application file for complete search history.

(56) References Cited

U.S. PATENT DOCUMENTS 6,556,199 B1    4/2003 Fang
7,672,790 B2    3/2010 McGraw
(Continued)

FOREIGN PATENT DOCUMENTS

CN    105235216 A    1/2016
CN    105538712 A    5/2016
(Continued)

OTHER PUBLICATIONS

Jin, et al., A Hybrid and Adaptive Tool-Path Generation Approach of Rapid Prototyping and Manufacturing for Biomedical Models, Computers in Industry, vol. 64 (3), 2013, pp. 1-21 (Year: 2013).*
(Continued)

*Primary Examiner* — Wilbert L Starks
(74) *Attorney, Agent, or Firm* — HP Inc. Patent Department (57) ABSTRACT

In an example, a method includes receiving object model data describing at least a portion of an object to be generated by additive manufacturing. Object generation instructions for generating the object in its entirety may be derived based on the object model data. Where it is determined that the object model data comprises a data deficiency for deriving
(Continued)

the object generation instructions, at least one attribute for the object may be inferred and object generation instructions may be derived based on the object model data and the inferred attribute.

15 Claims, 5 Drawing Sheets

Related U.S. Application Data continuation-in-part of application No. PCT/US2017/041345, filed on Jul. 10, 2017.

(56) References Cited

U.S. PATENT DOCUMENTS

| | | |
|---|---|---|
| 8,470,231 B1 | 6/2013 | Dikovsky et al. |
| 8,471,849 B1 | 6/2013 | Hickman et al. |
| 8,885,925 B2 | 11/2014 | Cameron et al. |
| 9,119,696 B2 | 9/2015 | Giordano |
| 10,144,178 B2 | 12/2018 | Meisner |
| 10,357,919 B2 | 7/2019 | Tringaly |
| 10,428,463 B2 | 10/2019 | Wang |
| 10,744,717 B2 | 8/2020 | Gottschalk-Gaudig |
| 10,781,315 B2 | 9/2020 | Saha |
| 10,857,730 B1 | 12/2020 | Cohen |
| 10,974,458 B2 | 4/2021 | Sanroma Garrit |
| 11,003,166 B2 | 5/2021 | Carruesco Llorens |
| 2011/0148871 A1 | 6/2011 | Kim et al. |
| 2013/0124151 A1 | 5/2013 | Mech |
| 2014/0324204 A1 | 10/2014 | Vidimce |
| 2014/0336808 A1 | 11/2014 | Taylor |
| 2014/0354630 A1 | 12/2014 | Kim et al. |
| 2015/0105889 A1 | 4/2015 | Tsai |
| 2015/0197063 A1 | 7/2015 | Shinar |
| 2015/0259548 A1 | 9/2015 | Wang et al. |
| 2015/0269289 A1 | 9/2015 | Kim et al. |
| 2015/0309494 A1 | 10/2015 | Kobayashi et al. |
| 2016/0012646 A1 | 1/2016 | Huang et al. |
| 2016/0082666 A1 | 3/2016 | De Pena et al. |
| 2017/0002978 A1 | 1/2017 | Ballinger et al. |
| 2017/0057169 A1 | 3/2017 | Grbic et al. |
| 2017/0061701 A1 | 3/2017 | Mittal et al. |
| 2017/0100210 A1 | 4/2017 | Wen |
| 2017/0106588 A1 | 4/2017 | Tabayashi |
| 2018/0056591 A1 | 3/2018 | Harayama |
| 2018/0071986 A1 | 3/2018 | Buller et al. |
| 2018/0117833 A1 | 5/2018 | Nagahari |
| 2018/0215094 A1 | 8/2018 | Birnbaum |
| 2018/0239251 A1 | 8/2018 | Lee |
| 2018/0250874 A1 | 9/2018 | Tringaly |
| 2019/0039320 A1 | 2/2019 | Choudury |
| 2019/0134915 A1 | 5/2019 | Schmidt |
| 2019/0231018 A1 | 8/2019 | Boutin |
| 2019/0315067 A1 | 10/2019 | Babu |
| 2020/0016822 A1 | 1/2020 | Levy |
| 2020/0019142 A1 | 1/2020 | Ulu |
| 2021/0299950 A1 | 9/2021 | Wolter |

FOREIGN PATENT DOCUMENTS

| | | |
|---|---|---|
| EP | 1229463 A2 | 8/2002 |
| EP | 2833328 A1 | 2/2015 |
| JP | 2006503735 | 2/2006 |
| JP | 2015093433 | 5/2015 |
| JP | 2016093914 | 5/2016 |
| TW | 200702034 A | 1/2007 |
| WO | WO-2013072874 A1 | 5/2013 |
| WO | WO-2013113372 A1 | 8/2013 |
| WO | WO-2016108154 | 7/2016 |
| WO | WO-2016119879 A1 | 8/2016 |
| WO | WO-2016140670 | 9/2016 |
| WO | WO-2016169614 A1 | 10/2016 |
| WO | WO-2016186609 | 11/2016 |
| WO | WO-2016186613 | 11/2016 |
| WO | WO-2016196382 A1 | 12/2016 |
| WO | 2017009831 A1 | 1/2017 |

OTHER PUBLICATIONS

Smith, Robust Geometric Methods for Surface Modeling and Manufacturing, Doctoral Thesis, University of California at Berleley, 2004, pp. 1-278 (Year: 2004).*

Chen, et al., Inferring Analogous Attributes, Proceedings of the IEEE Conference on Computer Vision and Pattern Recognition (CVPR), 2014, pp. 1-8 (Year: 2014).*

Su, et al., Estimating Image Depth Using Shape Collections, ACM Transactions on Graphics, vol. 33, Issue 4, Jul. 2014, Article No. 37, pp. 1-11 (Year: 2014).*

Klein et al., "From Scan to Print: 3D Printing as a Means for Replication", Retrieved from Internet: http://www.hpl.hp.com/techreports/2014/HPL-2014-30.pdf, Sep. 21, 2014, 6 pages.

Bader, C., et al., "Making data matter: Voxel printing for the digital fabrication of data across scales and domains," Science advances., May 2018, vol. 4, No. 5, pp. 1-13.

Fabian, "How to Choose the Perfect Wall Thickness for 3D Printing", 3D Printing Blog, https://i.materialise.com/blog/en, retrieved on Apr. 12, 2022, 10 pages.

Jennings ~ Cura 3D Tutorial—Introduction to Cura 3D, Jan. 12, 2017, < https://all3dp.com/cura-tutorial-3d-printing/ > 17 pages.

Tedia, S., et al., "Manufacturability analysis tool for additive manufacturing using voxel-based geometric modeling," 27th annual (SFF) symposium Aug. 8, 2016, pp. 3-22.

* cited by examiner

INFERRING OBJECT ATTRIBUTES

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material melts, coalesces and solidifies to form a slice of the three-dimensional object in accordance with the pattern. In other examples, coalescence may be achieved in some other manner.

In addition to a fusing agent, in some examples, a print agent may comprise a coalescence modifying agent (which may be referred to as modifying or detailing agents), which acts to modify the effects of a fusing agent and/or energy applied, for example by inhibiting, reducing or increasing coalescence or to assist in producing a particular finish or appearance to an object.

A property modification agent, for example comprising a dye, colorant, a conductive agent or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data may in some examples be processed to generate slices of parallel planes of the model. Each slice may define at least a portion of a respective layer of build material that is to be solidified or caused to coalesce by the additive manufacturing system.

Figure 1:
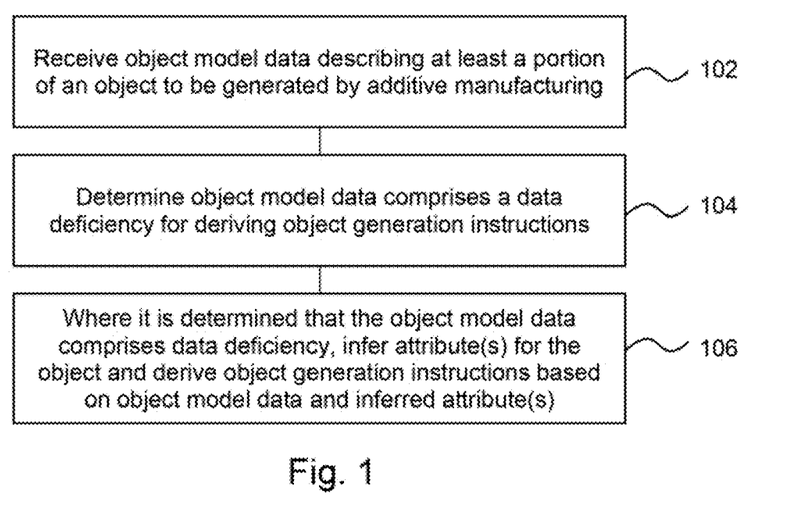
FIG. 1 is an example of a method for inferring an attribute and generating object generation instructions.

FIG. 1 shows an example of a method which may be a computer implemented method, for example carried out using at least one processor, and may comprise a method of deriving object generation instructions for generating an object when received data describing the object (e.g. a data model describing at least a portion of the object) is incomplete or insufficient to allow automatic derivation of object generation instructions in itself. For example, the geometry of the object may be specified without any reference to the intended object properties such as color, strength, resilience or the like. In another example, properties may be specified in association with an object surface but not for an object interior. In such cases, according to the method of FIG. 1, property attribute(s) may be inferred either in relation to the object model, or directly applied to deriving object generation instructions, in order to develop object generation instructions which are appropriate for object generation. This may be compared to, for example, selecting a default print material for object generation, such that the object is generated to have arbitrary properties.

Block 102 comprises receiving object model data describing at least a portion of an object to be generated by additive manufacturing. The data model may for example be received by a processor from a memory, over a network, over a communications link or the like.

In some examples, the object model data may comprise geometric object data, which may define a three-dimensional geometric model of at least a portion of the model object, for example describing the shape and extent of all or part of an object in a three-dimensional co-ordinate system, e.g. the solid portions of the object. In some examples, the data model may represent the object, or the surfaces of the object, as a mesh of polygons. The object model data may for example be generated by a computer aided design (CAD) application, or by a designer.

In some examples, the object model data may comprise property data. In some examples, this may example comprise a property 'map', which is associated with at least a portion of the object. There may be a mapping between locations of the object and the property map, and a property map may be any property data associated with such a mapping. In some examples, a property map may be associated with just the object's surface(s), while in other examples a property map may be associated with one or more interior portions of the object. Some examples of property maps may comprise 2D image files that can be applied to a 3D model to add color, texture, or other properties like glossiness, reflectivity, conductivity, transparency, strength, or the like. A property map may relate to a particular property, for example defining the coloration of the object over its surface (and thus providing surface patterns and the like), or strength of different object portions, or the like. In some examples, 3D property maps may be provided.

In other examples, the object property data may be specified in some other way so as to define at least one object property for at least a portion of the three-dimensional object to be generated. For example, property data may be associated with voxels of a voxelised object model, specified volumetrically or as an algorithm, or in some other form.

In some examples, the object property data may comprise data indicative of value(s) or parameter(s) for any or any combination of color, flexibility, elasticity, rigidity, surface roughness, porosity, inter-layer strength, density, transparency, conductivity and the like for at least a portion of the object to be generated. The object property data may define multiple object properties for a portion or portions of an object, and the properties specified may vary over the object.

As mentioned above, the method comprises deriving object generation instructions for generating the complete object based on the object model. However, in this example, the object model data in itself is insufficient to allow complete generation of the object generation instructions (or at least without resorting to default object generation instructions).

Block 104 comprises determining that the object model data comprises a data deficiency for deriving the object generation instructions. For example, this may be that no object property data is specified (for example, just the geometry of the object may be described). In other examples, object properties may be specified for some parts of the object, but not for the object as a whole (e.g. for the surfaces, but not for the interior). In object model data, properties (e.g. color, conductivity, etc.) may be represented in a form which is infinitesimal (zero or near-zero) in thickness (e.g. associated with a 2D surface as noted above). In other examples, the extent of an object location or region associated with a property may be insufficient to provide the property in practice (for example, too thin to provide a color, a conductive track, a resilient layer or the like).

Block 106 comprises, where (and in some examples, to the extent that) it is determined that the object model data comprises the data deficiency, inferring at least one attribute for the object and deriving the object generation instructions based on the object model data and inferred attribute. In some examples, the attribute(s) may be inferred based on a user input, or based on further data, which may be supplied with the object model data, or may be provided (directly or indirectly) from an object generation apparatus (or by some entity holding information about an object generation apparatus). In some examples, the method may comprise requesting such user input/further data, and inferring the attribute(s) based on a received response. In some examples, the attribute(s) may comprise object properties such as appearance and mechanical properties (e.g color(s), strength(s) or the like). Deriving the object generation instructions may comprise use of a mapping resource or the like, which may map between attributes such as object properties and the print material combinations to provide such attributes. Such print material combinations may specify the type and combination of build materials and/or print agents.

Thus there may be two 'streams' for deriving object generation instructions. For objects/object portions in which the object model data fully specifies the object, the object generation instructions may be based on the object model data alone. However, where the data is deficient on its own for deriving the object generation instructions, the object generation instructions may be based on inferred attribute(s). This may for example mean that default options are amended or replaced in at least some cases. In some examples, selection of a default object generation instruction or an object-model specific object generation instruction may be based on the inferred attribute(s). An object-model specific object generation instruction may for example be based on properties specified in relation to part of the object model data corresponding to a different portion of the object than the object portion to be generated by the object-model specific object generation instruction.

Figure 2:
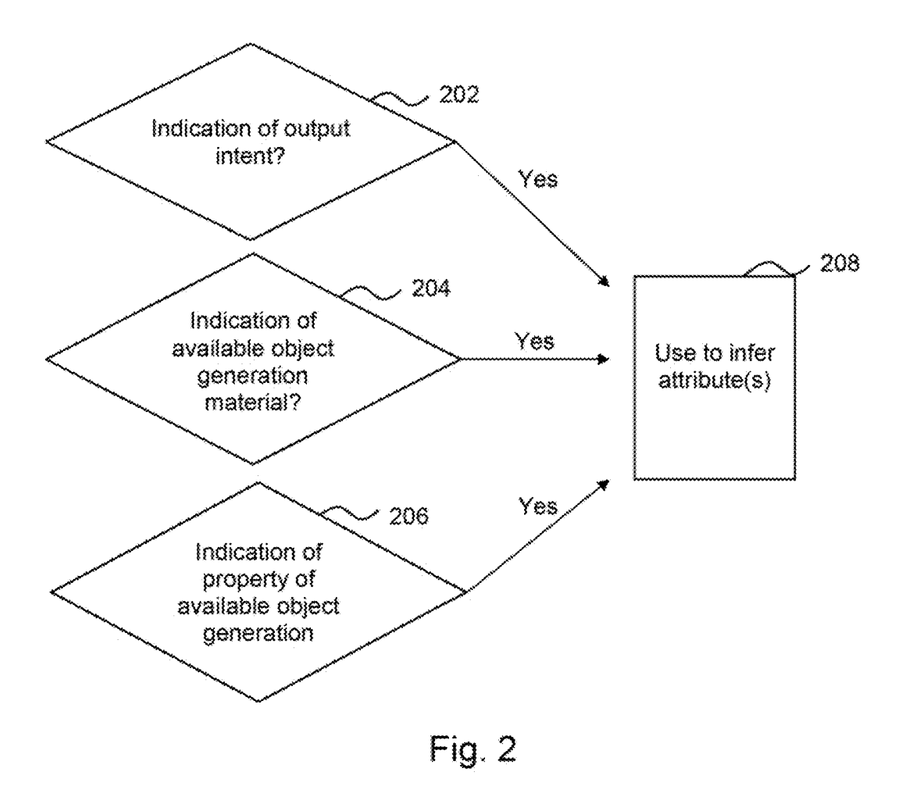
FIG. 2 is an example of a method for inferring attributes.

FIG. 2 is an example of a method which may be used in inferring attribute(s). In this example, there are a plurality of data sources which may be used in inferring attribute(s). In other examples, one or more of these could be used in any combination, and/or there may be additional or alternative data sources.

In block 202, it is determined if at least one indication of an output intent of object generation has been received. Such an output intent may for example comprise an aesthetic quality specification (for example, high quality, intermediate quality, draft quality or high chroma, low chroma or the like). Another example output intent may be a cost specification (for example, low cost). Another example output intent may be a functional specification, such as strength or a wear resistance quality. Other examples of output intents may be a dimensional accuracy specification (i.e. the resolution for object generation, which may result in instructions with regard to layer thickness or voxel size, or the like), time to print specification (either in terms of the actual object generation time, or a target completion time), or a material type (which may include a specification of a proportion or minimum proportion of recycled material). Such output intents may be indicated alone or in any combination.

In relation to recycled material, it may be the case that as an object is generated, part of each layer remains unfused/unsolidified. Such material may be recycled and used in further build operations. However, as recycled build material may be partially contaminated (for example with print agent such as fusion reduction agents which may be applied to material to remain unfused to define object boundaries), and/or its properties may change on processing, the proportion of recycled build material may be controlled, for example so as to be below a threshold. The threshold may be associated with a quality specification. Equally, it may be the case that for some build operations, it is intended to use at least a threshold amount of recycled material, for example to control costs or to meet ecological standards.

In block 204, it is determined if at least one indication of an available object generation material is provided.

For example this may comprise an indication of the availability of a particular build material and/or the specification of a build material, such as a plastic type and/or the proportions of recycled build material therein, or other material type to be used as the build material.

In some examples, this may comprise an indication of whether a particular print agent or print agent set is available.

For example, in some object generation systems, there may be more than one available fusing agents. For example, a selection may be made between a fusing agent based on carbon, which has a dark or black color, and a fusing agent which is lighter in color. For example, 'low tint' fusing agents may have thermally absorbent compositions such as a Cesium Tungsten Oxide (CWO) or Cesium Tungsten Bronze (CTB) composition. Such low tint fusing agents may be designed to absorb energy in the infrared spectrum, and may be substantially clear or transparent in the visible portion of the spectrum. A low tint fusing agent may have a relatively light color, for example a light cyan, can be combined with other colorants to produce a broad gamut of colors (which may be broader than that for combinations including carbon black fusing agent). However, such print agents may be relatively expensive compared to black fusing agent and use thereof may therefore be reserved for example in which it increases the brightness or the colorimetry of an object. The indication may be an indication which fusing agent(s) is/are available for a particular object generation operation.

Moreover, different property modification agent(s) may be provided in different object generation apparatus. For example, such agents may comprising a colorant, a conductive agent, or the like. For example, a colorant (e.g. a dye or pigment) may in some examples be used as a print agent to provide a particular color for the object. In a particular example, an object generation apparatus may have access to a set of colored print agents, for example comprising a set of cyan, magenta and yellow print agents. In some examples, this may be used to produce colors using the CYMK color set, where the black color may be provided by a carbon black fusing agent or in some examples a 'cosmetic' black colorant, selected for its color qualities rather than for its thermal absorptance qualities. In some examples, as a 'cosmetic' black print agent may not be as effective an absorber of radiation (e.g. IR or near IR radiation) relative to a carbon black print agent, it may be used on a surface of the object (where there may be an intention to restrict temperature such that build material outside the object remains unfused).

In block 206 it is determined if an indication of a property of an available object generation material is provided or derivable. For example, a property may comprise an indication of a transparency, elasticity, a processing temperature or range of processing temperatures (for example an indication of an ability to tolerate high temperature exposure), a proportion of recycled vs. virgin or unused build material, or the like.

In block 208, the indications which are received, provided or derived are used to infer attribute(s).

The indications of blocks 202, 204 and 206 may be received in a number of ways. For example, at least one indication may be received with the object model data, or may be provided by an operator (in some examples in response to a generated request or prompt, which may be generated following a determination that the object model is deficient), or may be provided from an object generation apparatus which is to generate the objection (in some examples after a request is made following a determination that the object model is deficient). Indications may be received over a network or provided locally, for example being held in a memory or the like.

In some examples, the method may be carried out by an object generation apparatus, or based on information about an object generation apparatus. Such information may comprise available object generation material choices and in some examples, build material mix ratio, operating parameter and parameter ranges and the like. Such information may in any event be retrieved in generating object generation instructions for generating an object, although in this example such information maybe additionally used to infer object attributes. In some examples, there may be a plurality of predetermined modes for generating object generation instructions, and a particular mode maybe selected based on an output intent or any other indication. In some examples, the modes may specify default options for generating object generation instructions which may be used unless object model data and/or inferred attributes indicate otherwise. In some examples, the modes may specify how object generation instructions may be derived based on inferred attributes. In some examples, the default options may be used for some object portions whereas there may be a different specification for deriving object generation instructions for object portions having inferred attributes or specified object properties in the original data model.

In some examples, the inferred attributes may be presented to an operator, who may accept, reject and/or amend the inferred attribute(s).

Figure 3:
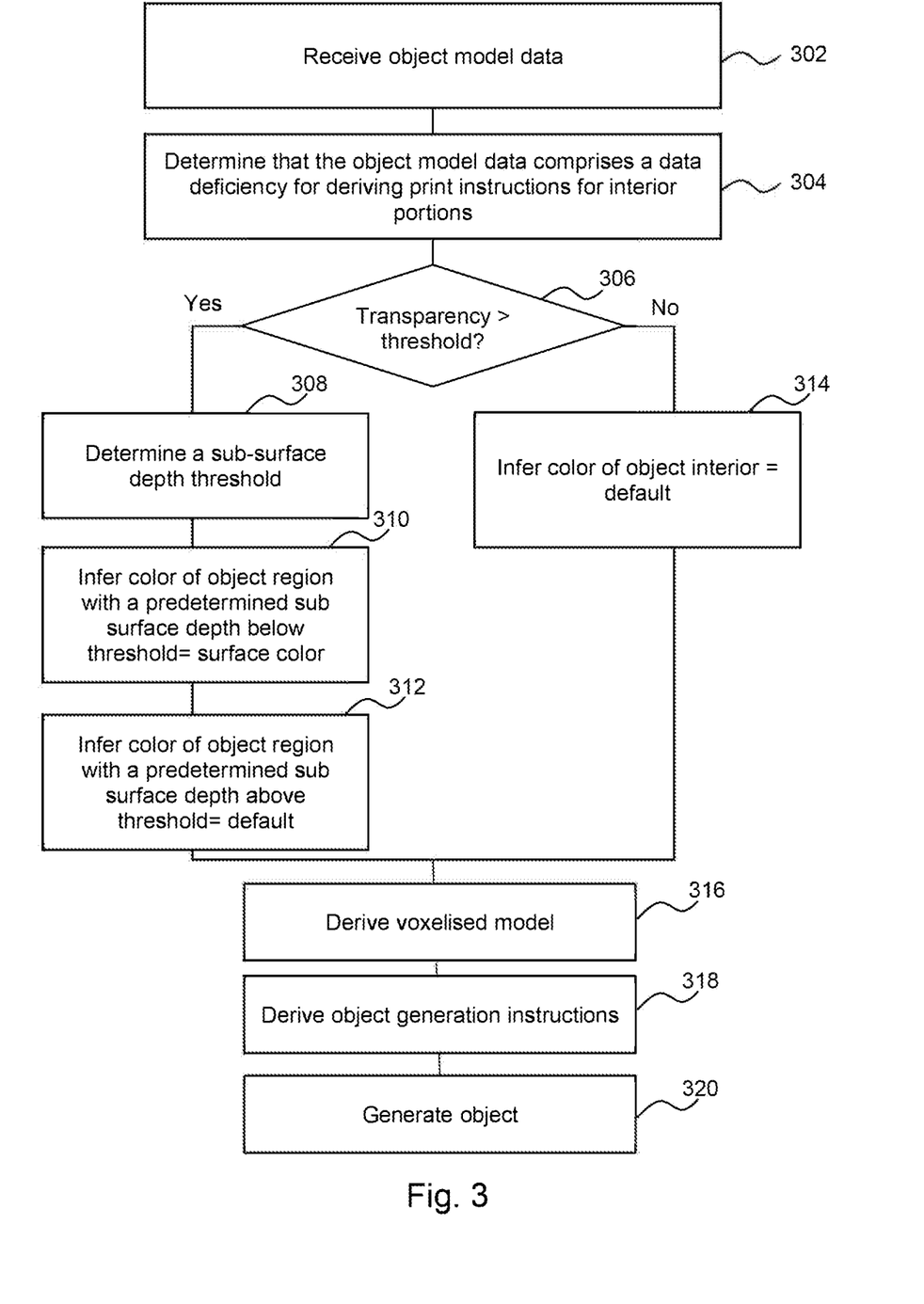
FIG. 3 is an example of a method for generating an object.

FIG. 3 shows an example of a process in which surface color of an object is specified in the object model, but interior color is not. In such an example, it may be determined that the object model data is deficient on its own for deriving the object generation instructions to print the whole object as the color data for the interior is missing. In this example, the method comprises determining inferring a color attribute for the interior (and in this particular example, the depth of a region of the object to be associated with a color attribute).

In this example, in block 302, the object model data is received. In block 304, it is determined that the object model comprises a data deficiency for deriving the object generation instructions, specifically in relation to the color of interior portions. In block 306, a property of the build material to be use in object generation is determined, specifically in this case the transparency thereof. For example, this information may be retrieved from directly or indirectly from an object generation apparatus which is to generate the object. If the build material has a transparency above a threshold, it is inferred that at least part of the interior region of the object is to have the color of the surface. In this this example, based on the transparency, a sub-surface depth threshold of an object region to be associated with the surface color is determined in block 308. This may for example be higher for more transparent materials than for less transparent materials. The color for the object region with a predetermined sub-surface depth below a threshold is inferred to match the color of the surface in block 310. The color for an object region with a predetermined sub-surface depth above the threshold is set to be a default value, which may be printed using relatively low cost materials (for example, carbon black) in block 312.

Thus, in examples in which the material has a transparency, this may be used to infer the depth to which a color is matched to the surface color. In other words, the color need not be consistent throughout an object portion for which attribute(s) (in this case, color) are inferred. In other examples, the entire object interior may be set to match the surface color.

If the build material has a transparency below the threshold value (i.e. the build material is relatively opaque), the color of the entire object interior may be set to be the default value in block 314. In other examples, the surface color may be extended into the object model to at least a default depth in all examples to ensure a sufficient thickness of a colorful shell around a core of a default color.

In block 316, a voxelised object model is derived, in which at least one voxel is associated with inferred attribute(s).

In some examples of additive manufacturing, three-dimensional space may be characterised in terms of such voxels, i.e. three-dimensional pixels, wherein each voxel occupies or represents a discrete volume. In some examples, the voxels are determined bearing in mind the print resolution of an object generation apparatus, such that each voxel represents a volume which may be uniquely addressed when applying print agents, and therefore the properties of one voxel may vary from those of neighbouring voxels. In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel, i.e. a voxel may comprise more than one object generation apparatus addressable location. In general, the voxels of an object model may each have the same shape (for example, cuboid or tetrahedral), but they may in principle differ in shape and/or size. In some examples, voxels are cuboids based on the height of a layer of build material (which may for example be around 80 µm in some examples). For example, the footprint of a voxel (i.e. area of the faces in the xy plane, where height is on the z axis) may be around 42 µm by 42 µm. In some examples, in processing data representing an object, each voxel may be associated with properties, and/or with object generation instructions, which apply to the voxel as a whole.

Thus, in this example, all voxels which correspond to a region of the object model for which a surface color is specified would be associated with the surface color, and all voxels which correspond to a region of the object model for which a default color is specified would be associated with the default color.

Block 318 comprises deriving the object generation instructions from the voxelised object model. Determining the object generation instructions may for example comprise use of a look-up table or the like. A determined object generation instruction may be a print instruction, which may for example specify a coverage of one or more print agents (e.g. a fusing agent, colorant or the like) to be applied to a particular region of a layer of build material. In some examples, the placement of print agent drops within the region may be determined through use of a halftoning operation.

Block 320 comprises generating an object based on the object generation instructions. For example, this may comprise forming successive layers of build material on a print bed, applying print agents according to the control instructions for that layer and exposing the layer to radiation, resulting in heating and fusion of the build material.

Figure 4:
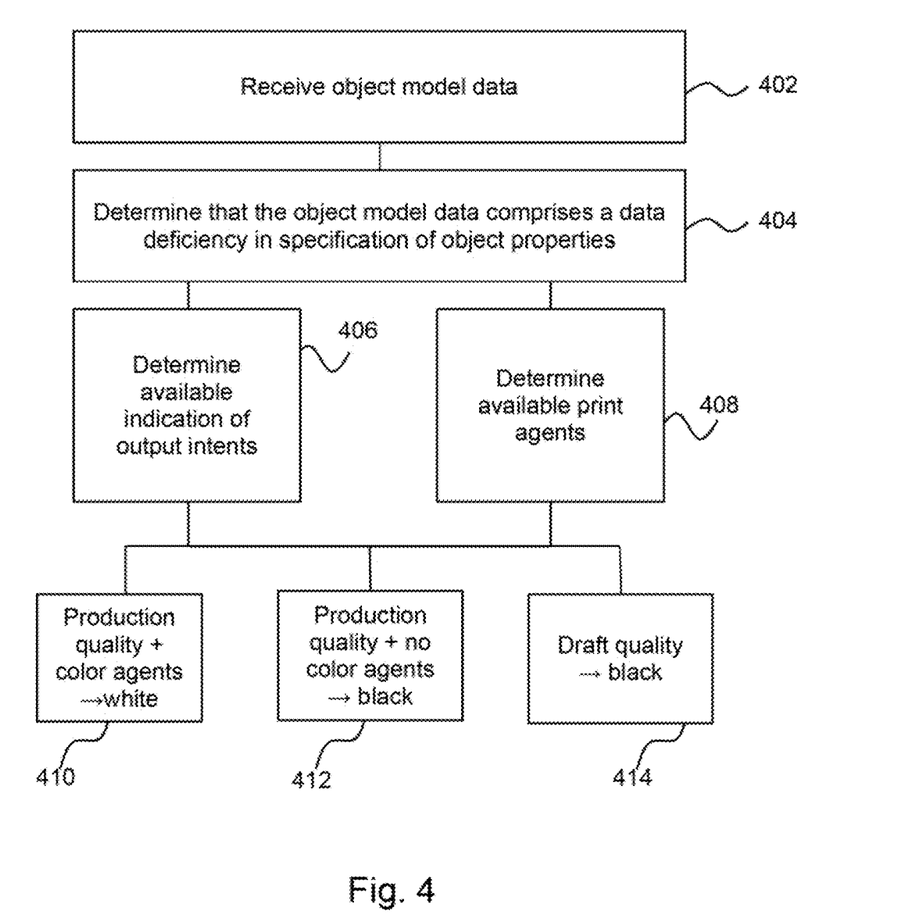
FIG. 4 is another example of a method for inferring attributes.

In another example, as is shown in FIG. 4, the geometry of an object is specified but no object properties are specified. In such an example, it may be determined that the object model data is deficient on its own for deriving the object generation instructions to print the whole object, as there are no stated object properties (e.g. color, strength, etc.). However, in this example, indication(s) of an output intent of object generation may be specified (for example, by an operator, in some cases following a request for the information, or may be provided with the data model of the object).

In block 402, the object model data is received. In block 404, it is determined that the object model comprises a data deficiency for deriving the object generation instructions, specifically in relation to a lack of object properties.

Block 406 comprises determining the available indications of output intent. In this example, these comprise an indication of output intent in relation to quality which may be one of production quality or draft quality. Block 408 comprises determining an indication of the print agents available, and specifically in this example if a color print agent set (which in this example comprises a low-tint fusing agent, a cyan print agent, a magenta print agent and a yellow fusing agent) is available in addition to a carbon black fusing agent.

If the output quality is 'production quality' and the color print agent set is available, then in this example the inferred attribute for the object may be that the object is white (block 410), which in turn may result in object generation instructions which utilise the low-tint fusing agent for at least a portion of the object. While white is selected here, in principle, the association of the inferred attribute(s) and the output intent (or any other basis on which the inference is made) may be any association, for example being specified in a rule set. In some examples, this portion may be an object shell defined to a sub-surface depth threshold as described above, and there may be an object core for which the inferred object property is black, which in turn may result in object generation instructions which utilise the (relatively low cost) carbon black fusing agent for the core portion. This in effect reserves the use of the low-tint fusing agent to the outer shell region. In another examples, the inferred attribute may be black, but a cosmetic black may be used to produce at least a surface shell.

If the output quality is 'production quality' and the color print agent set is not available, then in this example the inferred attribute for the object may be that the object is black (block 412), which in turn may result in object generation instructions which utilise the carbon black fusing agent.

If the output quality is 'draft quality', whether or not the color print agent set is available, then the inferred attribute for the object may be that the object is black (block 414), which in turn may result in object generation instructions which utilise the carbon black fusing agent. This may result in a low-cost object, which is suitable as a 'draft' version.

In other examples, a strength specification may infer a black or dark object is to be formed, for example leading to an object formed with a high-strength fusing agent. In turn, a specification of an output intent to produce an object of high strength may reduce the sub-surface depth threshold to which color is specified (as colored objects may be less strong than objects which are printed using print agents with higher energy absorptance).

In examples in which color is specified for at least part of the object, the quality specification may impact the sub-surface depth for which color is inferred. For example, a lower or draft quality object may be printed with a thinner colored outer shell than an object associated with a higher or production quality output intent.

In some examples, output intents can be combined. For example, where high quality color is requested at low cost this may result in a low layer thickness (i.e. thinner layers of build material may be formed) to minimise layer defects and a relatively thick outer colored shell, but the cost of this may be offset with an interior printed with a lower cost fusing agent such as carbon black. By way of contrast, if just the high quality color was specified, the color could be applied throughout the whole object.

Figure 5:
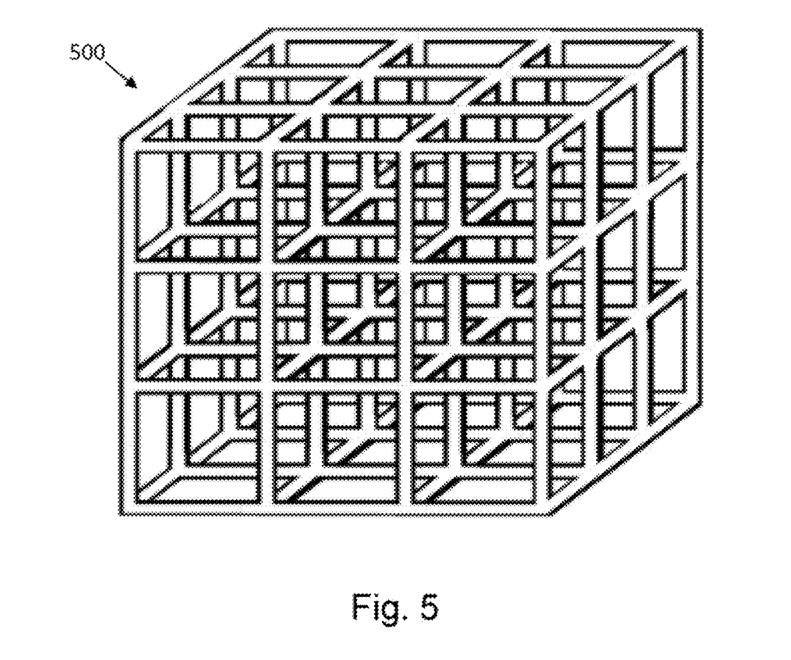
FIG. 5 is an example of a lattice structure.

In some examples, one option may be that the object generation process is carried out such that the interior of the object is intentionally left at least partially unsolidified, for example being hollow or solidified to form a structural 'lattice' of solidified material surrounding unfused material (or voids if such material is removed), which may in some examples, support a surface. This may result in a reduction in fusing agent costs. While in some examples the resulting object may be relatively weak, this may be of use in some cases, for example as a prototype or when strength is not an intended object attribute, as it reduces print agent use and therefore the cost of object generation. In some examples, a lattice/unsolidified interior may allow more build material to remain unfused, and potentially recycled. An example of a lattice structure 500 is shown in FIG. 5, although such a lattice may vary in structure and form, in the proportion of solidified material to unsolidified material, and the like.

In some examples, the choice of the object structure (e.g. whether the object is to comprise a lattice structure, and if so, the parameters thereof) may be inferred from an output intent (for example, the intention produce a low cost object, or to produce a draft object, or to keep costs low). The sub-surface depth of the object to be formed as a solid object (which may be zero), may also be based on this or other object output intents.

Such methods allow a balance between different manufacturing priorities. For example, aesthetics may be balanced with strength or cost. In examples, the attributes may comprise aesthetic properties such as color or resolution, functional properties (such as strength, wearability of the material, or the like), and/or an object structure such as a lattice structure.

In some examples, a method may comprise determining whether a departure from a default material choice or object generation instruction should be made based on the inferred attribute(s) and/or on indications of output intent, available output materials and/or the properties thereof. In other words, in some examples, a default material choice or object generation instruction may be selected unless indications of output intent, available output materials and/or the properties thereof result in an inferred attribute indicating a tailored or specific object generation instructions should be used.

Figure 6:
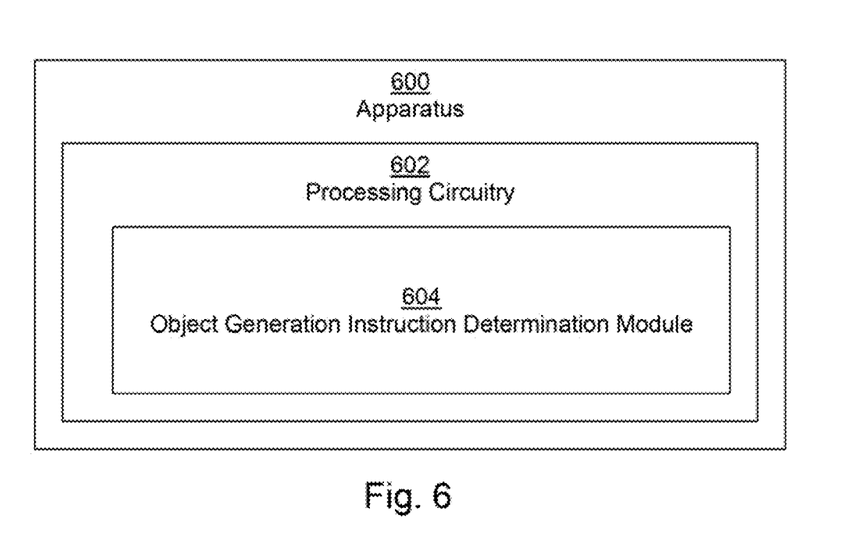
FIGS. 6 and 7 are examples of apparatus for processing data relating to additive manufacturing.

FIG. 6 is an example of an apparatus 600 comprising processing circuitry 602. In this example the processing circuitry 602 comprises a object generation instruction determination module 604 to derive object generation instructions for generating an object using additive manufacturing based on an object model describing the object, wherein the object generation instruction determination module is, to an extent that object model data is deficient for providing a basis for derivation of object generation instructions, to infer attribute(s) for the object and to derive object generation instructions based on the object model data and the inferred attribute(s). The object generation instruction determination module 604 may receive inputs, for example user inputs, inputs regarding object generation apparatus, in order to infer the attribute(s), or these may be inferred from data received with or as part of the object model.

The processing circuitry 602 may for example carry out the method of FIG. 1, 2 or 4, or parts of the method of FIG. 3.

Figure 7:
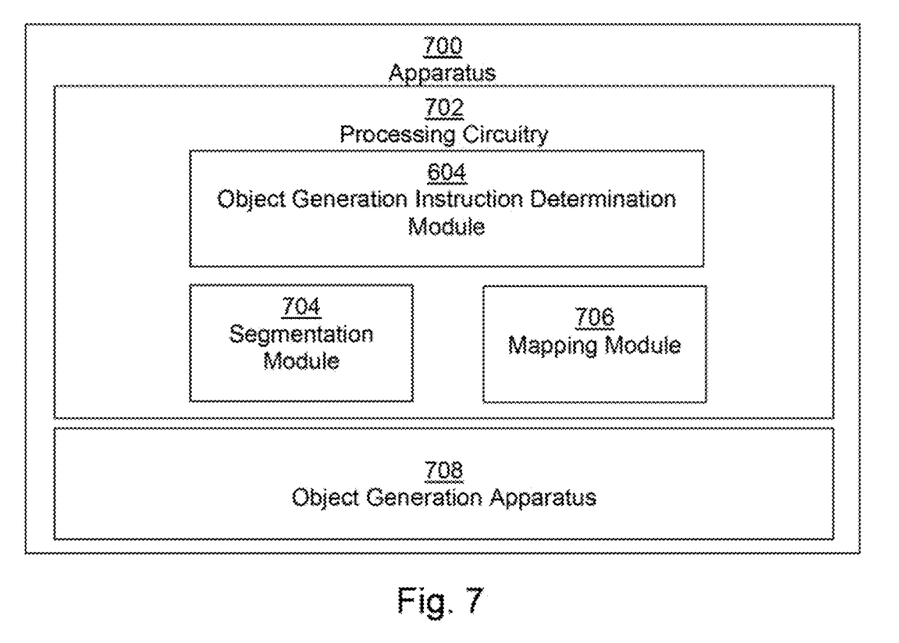

FIG. 7 shows an example of an apparatus 700 comprising processing circuitry 702 which comprises the object generation instruction determination module 604, as well as an object segmentation model 704 and a mapping module 706. The apparatus 700 further comprises object generation apparatus 708.

In this example, the object generation instruction determination module 604 is to determine at least one of an indication of an output intent, an indication of an availability of an object generation material and an indication of a property of an object generation material and to infer attribute(s) for the object based on the determined at least one indication. This may in turn mean that, for at least some received indications, a default object generation is not selected. In other words, in some examples, the object generation instruction determination module 604 may determine default print instructions unless a received indication is contrary to the selection of such default object generation instructions. In use of the apparatus 700, the object segmentation model 704 segments the object model into a first object region with a predetermined sub-surface depth below a threshold and a second object region with a predetermined sub-surface depth above the threshold, wherein the object generation instruction determination module 604 is to infer different attributes for the first and second object regions.

In use of the apparatus 700, the mapping module 706 maps object model data comprising inferred attribute(s) to object generation instructions, wherein the mapping module comprises a mapping resource associating attributes with object generation instructions (for example specifying the coverage of print agents).

The object generation apparatus 708 generates an object according to the control data and may to that end comprise additional components such as a print bed, build material applicator(s), print agent applicator(s), heat sources and the like, not described in detail herein.

The apparatus 700 may for example carry out the method of FIG. 1, 2, 3 or 4.

Figure 8:
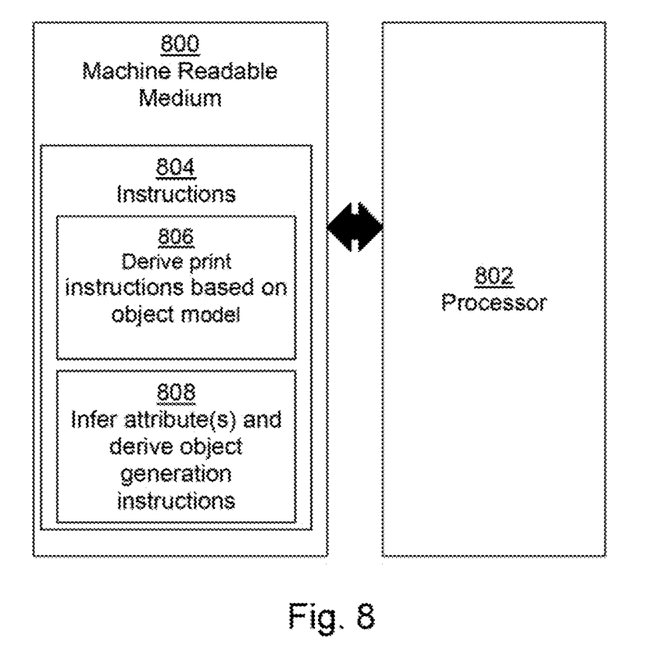
FIG. 8 is an example of a machine readable medium in association with a processor.

FIG. 8 is an example of a tangible, non-transitory, machine readable medium 800 in association with a processor 802. The machine readable medium 800 stores instructions 804 which, when executed by the processor 802, cause the processor 802 to carry out processes. The instructions 804 comprise instructions 806 to derive, based on object model data describing an object to be generated by additive manufacturing, object generation instructions for generating the object based on the object model. The instructions 804 further comprise instructions 808 to, if it is determined that the object model data comprises a data deficiency for deriving the object generation instructions, infer attribute(s) for the object and derive the object generation instructions based on the object model data and inferred attribute(s). In some examples, inputs may be used to infer the attribute(s), wherein the inputs may be user inputs, object design specifications (such as output intents) or may comprise data concerning an object generation apparatus or the object generation materials. The object generation instructions may comprise print agent coverage specification or other object generation parameters such as layer thickness, temperatures and the like.

In some examples, the instructions 804 may comprise instructions to cause the processor 802 generate a voxelized object model.

In some examples, the instructions 804 may comprise instructions to cause the processor 802 to determine control instructions for generating an object.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure.

Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object generation instruction determination module 604, object segmentation model 704, and/or the mapping module 706) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    receiving object model data describing an object to be generated by an additive manufacturing device;
    determining, by a processor, that the object model data specifies a first property for a first portion of the object without specifying a second property for a second portion of the object, wherein the first property for the first portion and the second property for the second portion are required to generate object generation instructions for fabricating the object;
    determining, from the object model data, a transparency level of a build material to be used in fabricating the object;
    based on the transparency level of the build material, inferring, by the processor, that the second property for the second portion is to match the first property for the first portion;
    generating, by the processor, the object generation instructions to be used in fabricating the object based on the object model data and the inferred second property for the second portion of the object; and
    using the additive manufacturing device and the object generation instructions based on the object model data and the inferred second property to fabricate a physical three-dimensional (3D) object.

2. The method according to claim 1, further comprising:
    receiving an indication of an output intent for a quality level of the object; and
    inferring a type of fusing agent to be used in fabricating the object based on the output intent of the quality level of the object.

3. The method according to claim 1, further comprising:
    receiving an indication of an availability of a particular build material to be used to fabricate the object; and
    inferring a type of fusing agent to be used in fabricating the object based on the availability of the particular build material.

4. The method according to claim 1, wherein the inferred second property for the second portion includes: an inferred conductivity or an inferred thickness for an interior portion of the object.

5. The method according to claim 1, further comprising:
    inferring a first attribute for a first region of the object having a predetermined sub-surface depth below a depth threshold and inferring a second attribute for a second region of the object having the predetermined sub-surface depth above the depth threshold.

6. The method according to claim 5, further comprising:
    determining the depth threshold based on at least one of: an intended quality of the object and the transparency level of the build material.

7. The method according to claim 1, further comprising:
    generating a voxelised object model in which at least one voxel is associated with the inferred second property of the object; and
    generating the object generation instructions further based on the voxelised object model.

8. The method according to claim 1, wherein the inferring of the second property for the second portion based on the transparency level of the build material comprises:
    determining whether the transparency level of the build material is greater than a transparency threshold;
    in response to a determination that the transparency level of the build material is greater than the transparency threshold, inferring that the second property for the second portion is to match the first property for the first portion; and
    in response to a determination that the transparency level of the build material is less than the transparency threshold, determining that the second property for the second portion has a predetermined default property.

9. The method according to claim 1, wherein the first property for the first portion of the object is a color for an exterior portion of the object, and the second property for the second portion of the object is a color for an interior portion of the object.

10. An apparatus comprising:
a processing circuitry; and
a memory storing instructions that, when executed by the processing circuitry, cause the processing circuitry to:
receive object model data describing an object to be generated by an additive manufacturing device,
determine that the object model data specifies a first property for a first portion of the object without specifying a second property for a second portion of the object, wherein the first property for the first portion and the second property for the second portion are required to generate object generation instructions for fabricating the object,
determine a transparency level of a build material to be used in fabricating the object,
based on the transparency level of the build material, infer that the second property for the second portion is to match the first property for the first portion,
generate the object generation instructions to be used in fabricating the object based on the object model data and the inferred second property for the second portion of the object, and
use the additive manufacturing device and the object generation instructions based on the object model data and the inferred second property to fabricate a physical three-dimensional (3D) object.

11. The apparatus according to claim 10, wherein the instructions cause the processing circuitry to:
receive an indication of an output intent for a quality level of the object; and
infer a type of fusing agent to be used in fabricating the object based on the output intent of the quality level of the object.

12. The apparatus according to claim 10, wherein the instructions further cause the processing circuitry to:
segment a model of the object into a first object region having a predetermined sub surface depth below a depth threshold and a second object region having the predetermined sub surface depth above the depth threshold, and infer different attributes for the first and second object regions.

13. The apparatus according to claim 10, wherein, to infer the second property for the second portion based on the transparency level of the build material, the instructions cause the processing circuitry to:
determine whether the transparency level of the build material is greater tha a transparency threshold;
in response to a determination that the transparency level of the build material is greater than the transparency threshold, infer that the second property for the second portion is to match the first property for the first portion; and
in response to a determination that the transparency level of the build material is less than the transparency threshold, determine that the second property for the second portion has a predetermined default property.

14. The apparatus according to claim 10, wherein the first property for the first portion of the object is a color for an exterior portion of the object, and the second property for the second portion of the object is a color for an interior portion of the object.

15. A non-transitory machine readable medium storing instructions which, when executed by a processor, cause the processor to:
receive object model data describing an object to be generated by an additive manufacturing device;
determine that the object model data specifies a first property for a first portion of the object without specifying a second property for a second portion of the object, wherein the first property for the first portion and the second property for the second portion are required to generate object generation instructions for fabricating the object;
determine a transparency level of a build material to be used in fabricating the object;
based on the transparency level of the build material, infer that the second property for the second portion is to match the first property for the first portion;
generate the object generation instructions to be used in fabricating the object based on the object model data and the inferred second property for the second portion of the object; and
use the additive manufacturing device and the object generation instructions based on the object model data and the inferred second property to fabricate a physical three-dimensional (3D) object.

* * * * *